Patented Dec. 13, 1949

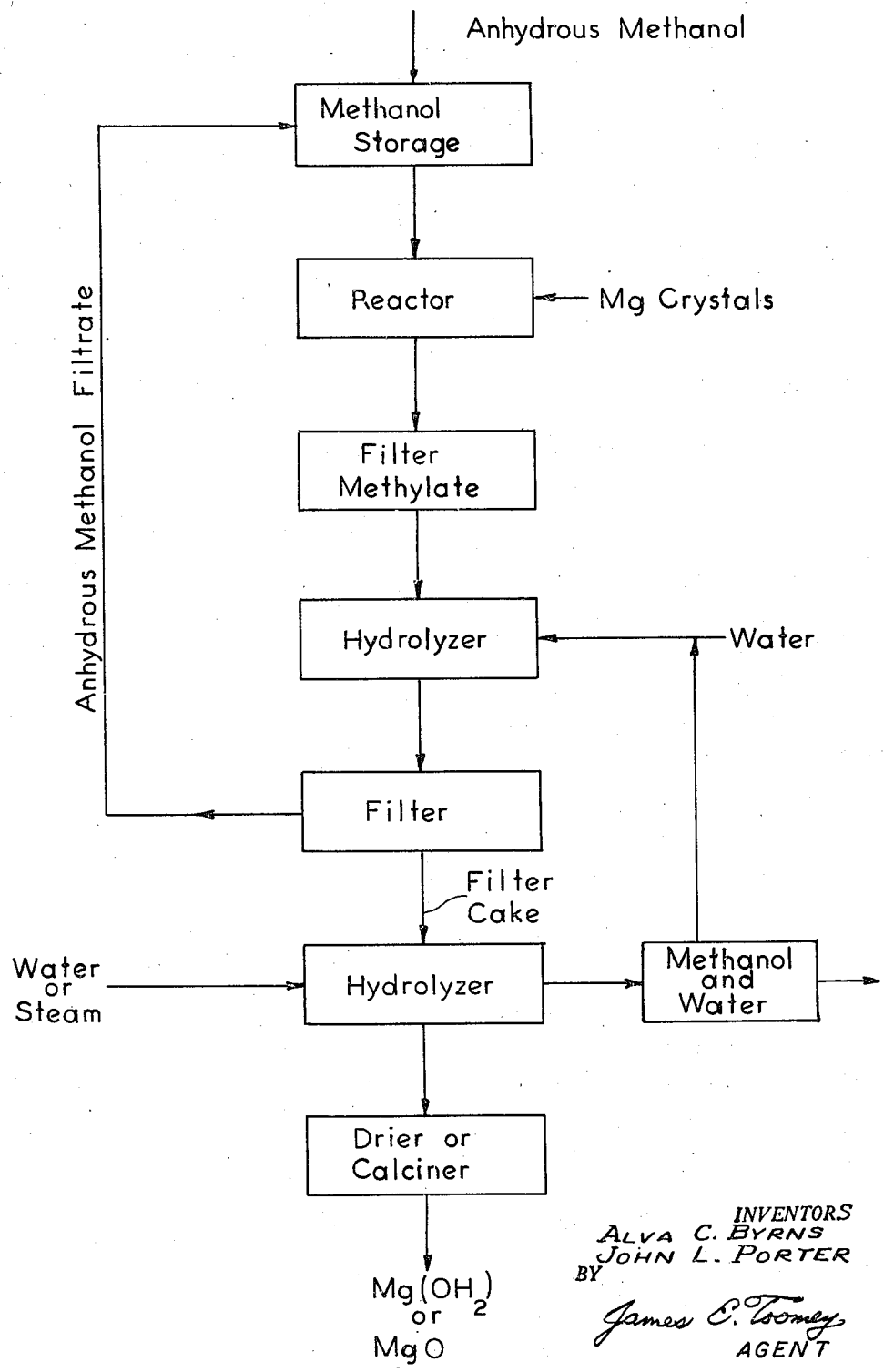

2,491,033

UNITED STATES PATENT OFFICE 2,491,033

PROCESS FOR PREPARING MAGNESIUM OXIDE AND HYDROXIDE

Alva C. Byrns, Los Altos, and John L. Porter, Palo Alto, Calif., assignors to The Permanente Metals Corporation, Oakland, Calif., a corporation of Delaware Application June 11, 1945, Serial No. 598,710

10 Claims. (Cl. 23—201)

1

This invention relates to magnesium compounds and processes for preparing the same, and particularly to the preparation of magnesium oxide and hydroxide of high purity and high activity.

Many ways of preparing magnesium oxide or hydroxide have, of course, been known to the art and perhaps those in most common use have been the recovery from seawater by treatment thereof with lime or dolomite, and the calcining of natural ores such as magnesite. Such methods however have yielded magnesium oxide or hydroxide containing appreciable amounts of impurities, which is disadvantageous for use in certain chemical reactions or in pharmaceutical preparations. Magnesium oxide or hydroxide having a higher purity than just described has heretofore been made by methods involving the repeated solution and precipitation of magnesium sulfate, carbonate or basic carbonate to obtain finally a purified product. The light and purified magnesia having high activity according to present standards is usually made from magnesium basic carbonate which has been prepared from seawater magnesium hydroxide, or from magnesite, or bicarbonate made from dolomite. However, both the purity and the activity of this product are also of limited degree. Heavy pharmaceutical MgO has high purity but is neither light nor active.

It is an object of this invention to produce magnesia having simultaneously greater purity and higher activity than the magnesias of the prior art, and to overcome the disadvantage of the known methods of production wherein one of these properties has necessarily been sacrificed in order to obtain the other.

According to this invention it has been found that, by hydrolyzing magnesium methylate with water in the proportion of less than 2 mols of water per 1 mol of the methylate, there is obtained magnesium hydroxide which is of satisfactory purity for various chamical reactions, for pharmaceutical purposes and the like, and which is in a very highly subdivided form. Upon dehydration this magnesium hydroxide yields correspondingly pure and highly subdivided magnesia.

The activity of the magnesia produced by the process of this invention is measured suitably by the method wherein 100 ml. of a 0.1N solution of iodine in carbon tetrachloride is treated with 4 grams of the magnesia for 15 minutes, the magnesia allowed to settle, and residual iodine determined in a sample of the clear liquid. The

2 amount of iodine removed from solution expressed in milli-equivalents per 100 gms. MgO is the iodine number as herein referred to.

The magnesium methylate which is employed as the hydrolyzable compound in this invention may be prepared by any suitable manner, for example, by reacting a magnesium base alloy or crude Mg-containing condensate obtained in the carbothermic process, and known as carbothermic dust, with methyl alcohol, which may be anhydrous methanol, or methanol admixed with a methanol miscible organic liquid such as benzol, light petroleum fraction or the like. An especially advantageous method of preparing the methylate is to react magnesium crystals, obtained by condensing magnesium vapor which has been sublimed or which has been distilled from a magnesium-containing material, with anhydrous methyl alcohol. Magnesium crystals recovered in the silicothermic process for making magnesium metal or those obtained from the sublimation refining step of the well-known carbothermic process, or crystals obtained by distillation of magnesium from a magnesium-yielding material, are suitable for preparing the methylate. The crystals react with methyl alcohol to give magnesium methylate which is soluble in the excess alcohol present, and hydrogen which may if desired be recovered. By the latter procedure a very pure magnesium methylate is obtained.

In the process of this invention, magnesium methylate in methanol solution is hydrolyzed to give a readily separable solid precipitate. This method is realized by hydrolyzing with an amount of water less than that required to satisfy the equation

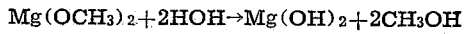

$$Mg(OCH_3)_2 + 2HOH \rightarrow Mg(OH)_2 + 2CH_3OH$$

or, in other words, with less than 2 mols of water per 1 mol of methylate. The proportion of water which is added, within the stated limits, will be selected according to the conditions of operation, for instance, as to the particular equipment and circulation rate employed. By allowing a sufficiently long time of reaction and circulation, or by employing higher temperatures, or by a combination of both, it is possible to approach the upper limit of 2 mols of water per 1 mol of magnesium methylate and still maintain anhydrous methanol solution, or in other words, to prevent the formation of the hydroxide as a nonfilterable gel.

In the accompanying drawing is diagrammed a flow-sheet of a preferred method for carrying out the process of this invention.

It is believed that the first principal product formed, which is stable in the early stages of the hydrolysis, is magnesium basic methylate, according to the reaction.

$$Mg(OCH_3)_2 + HOH \rightarrow Mg.OH.OCH_3 + CH_3OH$$

The mechanism of the reaction, however, has not been fully determined. It may be that magnesium hydroxide is first formed and that this compound then reacts with magnesium methylate still present to give the basic methylate. In whatever manner the reaction does proceed, it has been found advantageous in practice to initiate the hydrolysis with from about 0.9 to about 1.2 mols of water (or approximately mol for mol of methylate), to recover the readily separable solid precipitate thereby formed, and to subject the precipitate to further hydrolysis with a further amount of water to obtain magnesium hydroxide.

In order to avoid the formation of a non-separable gel or fluid sol and to obtain a precipitate which settles readily and is filterable, water is added to the solution of magnesium methylate in methanol with thorough dispersion, suitably by adding water thereto slowly and with vigorous agitation, or by adding slowly water diluted with alcohol with sufficient agitation. In the preferred embodiment of this invention, as stated above, approximately one mol of water is added per mol of methylate, slowly and with vigorous agitation, and there is obtained a partially hydrolyzed product, which settles, when agitation ceases, to permit decantation of most of the liquid. The remaining liquid is separated from the solid, preferably by filtration. The liquid portions are anhydrous and contain methanol, methanol-miscible organic solvent if any has been employed, and possibly residual amounts of magnesium methylate. This liquid can be recycled in this process or treated in any other desired manner.

The solid material, washed with methanol and benzol and dried, which is recovered from the first hydrolysis step, in the preferred procedure, is a partially hydrolyzed, finely divided product. Its ignition loss averages about 40%, and heating to 200° C., even under vacuum, does not drive off methanol, but calcination of the product at 300° to 400° C. gives a strong odor of formaldehyde. The presence of bound methanol in the solid product or compound has been demonstrated by oxidation methods. A quantitative measure may be obtained by hydrolysis of the thoroughly dried product by treating with an excess of water, distilling off the alcohol-water mixture and determining alcohol by standard procedures. These circumstances, as well as the determination of the equivalent weight of the product by titration against standard acid, are evidence that the product is basic magnesium methylate, with some admixture generally of magnesium hydroxide.

The solid product is now treated with water to complete the hydrolysis to magnesium hydroxide. This is suitably accomplished by admixing therewith an excess of water and agitating until hydrolysis is complete. The mixture is filtered to recover solid magnesium hydroxide and a solution of methanol in water. Alchohol can be recovered from the solution by fractionation or the solution may be used for any desired purpose.

Alternatively the basic methylate precipitate can be hydrolyzed by adding a slight excess of water, and heating to evaporate off the alcohol which may be recovered if desired. The dried cake can, for example, be passed through a heated zone by means of a screw conveyor, or can be treated in a rotary oven, being passed through in either case countercurrent to a flow of steam. By tumbling the solid material in a manner whereby all the particles are eventually exposed to the action of water vapor, the unhydrolyzed material is hydrolyzed and the alcohol goes off with the excess steam and may be recovered in known manner.

By hydrolysis of the basic methylate precipitate there is obtained after drying a light, fluffy magnesium hydroxide of purity corresponding to that of the methylate starting material and of extremely small particle size. Where magnesium crystals obtained by sublimation are reacted with absolute methanol to form the starting methylate, magnesium hydroxide of very high purity is the final product of hydrolysis. However, where a magnesium base alloy is used to make the methylate, the final product will also contain small amounts of certain alloying elements, notably manganese, zinc, aluminum, silicon, calcium, copper, lead. These are not objectionable for some purposes.

The magnesium hydroxide obtained as described may be dried, and may be used for making other magnesium compounds, or it may be dehydrated to magnesia, or it may be used as such. It is an advantage that magnesium hydroxide can be prepared according to this process of such purity as to be usable for pharmaceutical preparations. It is a further advantage of the hydroxide prepared starting with sublimed crystals that it can be used for preparing magnesium compounds wherein freedom from even very slight contamination is essential, as in fluorescing magnesium tungstate for example. It has previously been observed that addition of water to an alcohol solution of magnesium methylate hydrolyzes the methylate to a firm gel or fluid sol, depending upon the methylate concentration. Neither the gel nor sol can be filtered. When the gel, containing an appreciable amount of magnesium hydroxide, is dried it forms hard granules and these, when calcined, yield heavy MgO. It is an advantage of the process of this invention, on the other hand, that gel or sol formation is avoided and another advantage is that a light product is obtainable.

The magnesium hydroxide can be dehydrated to magnesia, suitably by calcining. Calcination is preferably carried out in an externally fired zone. While the hydroxide will give up water at lower temperatures it is found advantageous in practice to calcine at temperatures of about 500–700° C., at which the decomposition rate is satisfactorily rapid. Preferably the magnesium hydrate is calcined under mild conditions, and to about 4% to 8% ignition loss, to form highly active MgO. Calcination to about 7% to 8% is preferred for making MgO of the highest activity. If very pure MgO of higher bulk density be desired, calcination may be carried to lower ignition loss. The magnesium oxide obtained by removal of one mol of water from one mol of the magnesium hydroxide made according to this invention has characteristic properties. Whereas with magnesia heretofore known, no iodine adsorption or very little is exhibited when the product is calcined to zero ignition loss, in the case of magnesia prepared according to this invention on the other hand, calcination to zero ignition loss yields a finely divided, fluffy magnesia powder having an iodine number of from 12 to 40, depending somewhat upon the magnesium used in making the methylate. It is believed that iodine numbers of such values are due to lack of sintering during calcination, which in turn is due to the high purity of the magnesia, inasmuch as the presence of impurities favors sintering and consequent loss of active surface. Magnesia produced by the present method is essentially free of sulfate and choride ions, although where magnesium pig is employed to form the methylate traces of chloride occluded therein from the flux may be carried over into the magnesium oxide. In general, magnesia prepared by the method of this invention contains not more than about 0.01% total material other than MgO, as determined by spectographic analysis. When working according to the process of this invention magnesium oxide can be obtained which is capable of adsorbing 175 to 210 milli-equivalents of iodine per 100 gms. MgO from a 0.1N solution of iodine in carbon tetrachloride, when determined as hereinabove described.

It is an advantage of such magnesia that it is useful as pharmaceutical grade material. It is a further advantage that it may be used in making magnesium compounds which, for chemical syntheses or for industrial uses, for example, are required to be of high purity, as in luminescent or phosphorescent pigments etc. This magnesia is very finely divided and of such high surface activity that it is also useful in compounding rubber or synthetic rubber. Because of its high purity it is also useful in making electrically fused magnesia for electrical insulating purposes.

It is well known that the properties of MgO, such as bulk density, surface activity, particle size and hydraulic properties, vary considerably in different preparations and are determined particularly by the nature of the precipitate and calcination. Hitherto the magnesium compound has been precipitated from water solution as the hydroxide, carbonate, basic carbonate, sulfate etc. with inherent limitations on the nature of the final calcined product. The characteristics of the magnesia obtained by calcination of the material precipitated from methanol solution differ from the magnesia of the prior art obtained by way of water solution. This is evidenced by the facts that magnesia of this invention is commercially producible with a total impurity content of not over about 0.01%, that magnesia can be so produced which is simultaneously highly active, having an iodine number of from about 175 to about 210 with a residual iodine content of about 0.02 equivalents per liter of carbon tetrachloride solution, depending upon the conditions of calcination and residual ignition loss obtained, furthermore that the hydroxide produced according to this invention can be calcined at lower temperatures to a magnesia having a lower ignition loss than with the less pure hydroxide precipitated from water solution.

As an example of the method of operation according to this invention, to anhydrous methanol are added about 3.5% by weight of magnesium crystals obtained by condensing magnesium vapors sublimed from carbothermic dust, the materials being brought together in a flask fitted with a reflux condenser, as the reaction between methanol and magnesium proceeds very energetically after any traces of water in the methanol have been eliminated. The resulting methanol solution, separated from any sludge which may have formed and containing 0.096 gm. mol of magnesium methylate per 100 cc. of solution, is hydrolyzed by introducing into a reaction vessel by way of small tubes, the incoming solution stream coming into contact with a small stream of water from a separatory funnel and the mixed liquids being thoroughly dispersed in each other by continuous forced circulation by pumping. The water added amounts to 1.0 mol of water per mol methylate and it is added over a period of at least one hour while the total mixture is recirculated at a rate of about 30 times per hour. Circulation is continued for an hour after all water has been added in order to break down any small gel clumps which may have formed and to insure thorough blending. After reaction is complete, the solid precipitate is filtered off by means of a nitrogen pressure filter employing 15 to 20 lbs. nitrogen pressure.

The filtrate, which is anhydrous methanol containing residual magnesium methylate, is returned to methanol storage and is available for further reaction with magnesium to form the desired methylate solution.

The solid residue obtained by filtration is now hydrolyzed substantially to completion by placing in a flask with excess water, agitating by the introduction of steam jets within the mixture whereby water and methanol are vaporized off. Upon drying the residual solid after separation from the water remaining in the flask, a fine, soft-textured powdered magnesium hydroxide is recovered. Alternatively, the filter cake can be placed in a flask with excess water and heated in air preferably to not over 130° C., while agitating by introduction of a stream of nitrogen. The methanol-water mixture distilled off in either procedure is suitably led through a condenser and recovered.

The magnesium hydroxide powder can be used for a variety of purposes as stated above. However, if it be desired to obtain magnesium oxide, the hydroxide is in this example, calcined by heating for 1 hour at 500° C. The resulting MgO has an iodine number of 185 as determined by measuring the removal of iodine, from a 0.1N solution of iodine in carbon tetrachloride, by 100 grams of MgO, the residual iodine after adsorption being 0.02 equivalents per liter of solution. The bulk density of the un-milled MgO is 7.4 lbs. per cu. ft. The spectrographic analysis in this example, shows the presence of 0.0005% Si, 0.0001% Sn, 0.001% Cu, 0.001% Fe, 0.0005% Pb and 0.0005% Ca.

In the example above, the magnesium methylate can also be used as a solution thereof in a constant-boiling mixture of methanol and benzol. Also, when the partially hydrolyzed solid precipitate is formed it can be allowed to settle to give a clear supernatant liquid and a lower portion containing about 10% solids, the clear liquid being decanted off and the lower portion, filtered. The preferred time of addition of water in the first hydrolyzing step will vary with the type and efficiency of mixing employed. That is to say, the added water is dispersed so rapidly and thoroughly that an effective amount of magnesium basic methylate is believed to be formed and that formation of a non-separable gel does not occur.

What is claimed is:

1. Process for making magnesium hydroxide of high purity which comprises adding water to a solution of magnesium methylate in methanol in the proportion of from about 0.9 to about 1.2 mols of water per mol of methylate, said addition being at a slow rate and with vigorous agitation, separating from the resultant mixture solid, partially hydrolyzed material, and admixing water with said solid material to hydrolyze to magnesium hydroxide.

2. Process for making magnesium oxide of high purity which comprises adding water to a solution of magnesium methylate in methanol in the proportion of from about 0.9 to about 1.2 mols of water per mol of methylate, said addition being at a slow rate and with vigorous agitation, filtering to recover solid, partially hydrolyzed material, admixing water with said material to hydrolyze to magnesium hydroxide, filtering to recover magnesium hydroxide, and calcining said hydroxide to magnesium oxide.

3. Process for making magnesium hydroxide of high purity which comprises reacting magnesium with anhydrous methyl alcohol to form a methanol solution of magnesium methylate, adding water to said solution in the proportion of approximately 1 mol of water per mol of methylate, said addition being at a slow rate and with vigorous agitation, filtering to recover solid, partially hydrolyzed material, and admixing water with said solid material to hydrolyze to magnesium hydroxide.

4. Process as in claim 3 wherein the magnesium is crystalline magnesium obtained by condensation of sublimed magnesium vapor.

5. Process for making magnesium oxide of high purity which comprises reacting magnesium with anhydrous methyl alcohol to form a methanol solution of magnesium methylate, adding water to said solution in the proportion of approximately 1 mol of water per mol of methylate, said addition being at a slow rate and with vigorous agitation, filtering to recover solid, partially hydrolyzed material, admixing water with said solid material to hydrolyze to magnesium hydroxide, separately recovering said magnesium hydroxide, and calcining to magnesium oxide.

6. Process as in claim 5 wherein the magnesium is crystalline magnesium obtained by sublimation from magnesium-containing material.

7. Process as in claim 5 wherein the magnesium is crystalline magnesium obtained by distillation from magnesium-containing material.

8. Process as in claim 5 wherein the magnesium oxide is calcined to from about 4% to about 8% ignition loss.

9. A process according to claim 5 in which the magnesium hydroxide is calcined at a temperature of from about 500 to about 700° C.

10. Process for making magnesium oxide of high surface activity which comprises hydrolyzing magnesium methylate in methanol solution to form solid, precipitated magnesium basic methylate, filtering to recover said solid, precipitated basic methylate, hydrolyzing said basic methylate to magnesium hydroxide, filtering to recover said hydroxide, and calcining to magnesium oxide under mild conditions.

ALVA C. BYRNS.
JOHN L. PORTER.

REFERENCES CITED

The following references are of record in the file of this patent:

UNITED STATES PATENTS

| Number | Name | Date |
| --- | --- | --- |
| 2,287,088 | Cohen | June 23, 1942 |

OTHER REFERENCES

Mellor: "Inorganic and Theoretical Chemistry," vol. 4, pp. 266–7.

Whitmore: "Organic Chemistry" (1937), 4th edition, D. Van Nostrand Co. Inc., New York, p. 105.